March 28, 1961 R. P. TALAMBIRAS 2,977,547

DIFFERENTIAL AMPLIFIER

Filed Aug. 1, 1958

INVENTOR.
ROBERT P. TALAMBIRAS
BY
Joseph Weingarten
ATTORNEY

United States Patent Office 2,977,547

Patented Mar. 28, 1961

2,977,547

DIFFERENTIAL AMPLIFIER

Robert P. Talambiras, Boston, Mass., assignor to Epsco, Incorporated, Boston, Mass., a corporation of Massachusetts Filed Aug. 1, 1958, Ser. No. 752,603

3 Claims. (Cl. 330—69)

The present invention relates in general to differential amplifiers and more particularly concerns an improved differential amplifier input circuit arranged to prevent separate energizing sources from being loaded by the respective differential amplifier inputs.

For a general discussion of differential amplifiers, reference is made to the co-pending applications of Frank M. Young entitled Differential Amplifier, Serial No. 690,358, filed October 15, 1957, now Patent Number 2,896,031 issued July 21, 1959, and Paul G. Lucas entitled Differential Amplifier, Serial No. 739,282, filed June 2, 1958, now Patent Number 2,941,155 issued June 14, 1960. High performance differential amplifiers of the type disclosed in these applications are especially useful in responding to the small potentials developed across strain gauges and thermocouples where the differential mode is of interest. These transducers provide low level signals at a significant impedance level. While the disclosed amplifiers have the required sensitivity and present a sufficiently high input impedance for most applications, some transducers are loaded to an extent sufficient to cause inaccurate output indications. This occurs because the transducers generally have different impedance values so that an undesired differential signal is developed which is proportional to the common mode signal. Although these inaccuracies are slight, they tend to detract somewhat from the value of otherwise very precise measurements of the differential mode.

Accordingly, the present invention contemplates and has as a primary object the provision of a differential amplifier having an input circuit which does not load separate energizing sources coupled to the respective inputs of the differential amplifier, yet provides considerable amplification of the differential mode in the signals from the separate sources.

According to the invention, the signal applied to one of the two differential amplifier inputs is amplified to provide a feedback signal. This feedback signal is positively fed back to both differential amplifier inputs to effectively raise the input impedance presented to the respective energizing sources.

Figure 1:
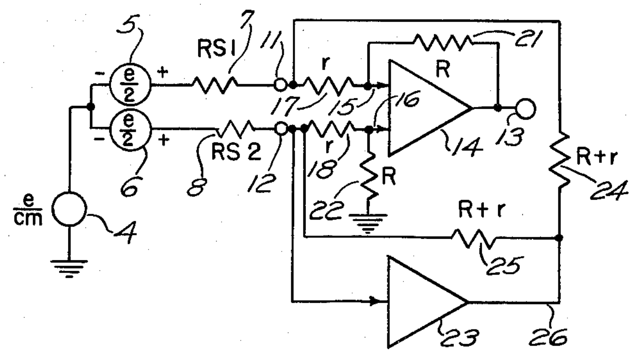
Figure 2:
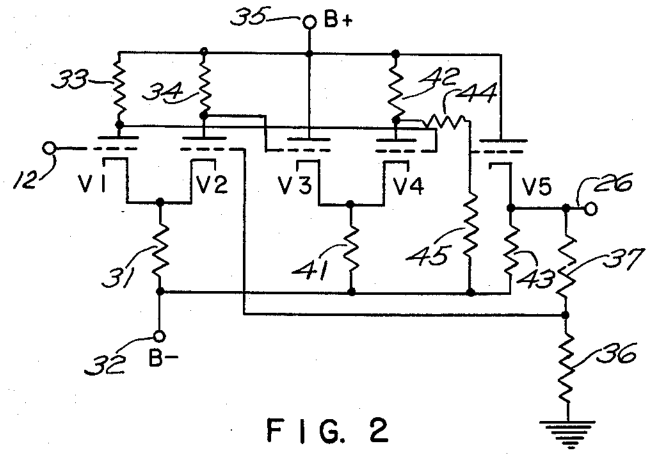

Other features, objects and advantages of the invention will become apparent from the following specification when read in connection with the accompanying drawing in which:

Fig. 1 is a combined block-schematic circuit diagram illustrating the general principles of the invention; and Fig. 2 shows a schematic circuit diagram of an auxiliary amplifier having a gain of two.

With reference now to the drawing, and more particularly Fig. 1 thereof, there is illustrated a combined block-schematic circuit diagram of apparatus embodying the inventive concepts. The amplified difference, $e$, between the level of input signals delivered by sources 5 and 6 through source resistances 7 and 8 respectively to terminals 11 and 12 is provided on output terminal 13 of differential amplifier 14 while the common mode signal, $e_{cm}$, is rejected almost completely. Terminals 11 and 12 are coupled to the first and second inputs 15 and 16 of differential amplifier 14 by resistors 17 and 18, respectively, each having a value designated $r$. A feedback resistor 21 of value R is connected between output terminal 13 and the first input 15. Another resistor 22 of value R is connected between input 16 and ground.

Input terminal 12 is also coupled to the input of amplifier 23. Positive feedback resistors 24 and 25, each of value $R+r$, are connected between output line 26 of amplifier 23 and input terminals 11 and 12, respectively. Amplifier 23 has a gain of two.

Having described the physical arrangement of the novel system, its mode of operation will be discussed. In order to understand the problem which the invention overcomes, it is helpful to represent the two input signal sources by a voltage source 4 providing a common mode signal which is applied to both inputs through respective ones of voltage sources 5 and 6, each providing half the differential signal, $e/2$. The source impedance of the two different signal sources are represented by the resistances 7 and 8 having values $R_{S1}$ and $R_{S2}$, respectively, connected between source 5 and input terminal 11 and source 6 and input terminal 12, respectively. In general, the values $R_{S1}$ and $R_{S2}$ are different. Therefore, the current flowing into input terminals 11 and 12 in response to the common mode signal $e_{cm}$ causes an undesired differential signal to be developed across these terminals having a magnitude proportional to the common mode voltage $e_{cm}$ in the absence of the positive feedback provided according to the invention.

This undesired differential signal is prevented from developing by using positive feedback in a manner best understood by considering the following example. Consider a rise in the common mode signal of one volt. If the input impedance presented to common mode signals at terminals 11 and 12 is infinite, then the potential on terminals 11 and 12 will rise by the same amount. Assuming this to be true, then a rise of one volt is sensed by the input of amplifier 23, having a gain of +2, thereby providing a rise of two volts on line 26. The attenuator formed by resistors 18, 22 and 25 attenuates the two volt rise on line 26 by exactly one-half so that a one volt rise is fed back to terminal 12. Similarly, the attenuator formed by resistors 24, 17 and 21 attenuates the two volt rise on line 26 by the same factor so that a one volt rise is also fed back to terminal 11. (The impedance of output terminal 13 with respect to ground is very low because of the high degree of negative feedback.) Thus, when the common mode signal rises a volt, an opposing voltage of the same amount is fed back to terminals 11 and 12 so that both ends of resistors 7 and 8 rise by the same amount and no current flows in these resistors due to a common mode signal. Since the impedance is voltage divided by current and a change in common mode voltage causes no change in the current delivered to input terminals 11 and 12, the effective impedance at these terminals is essentially infinite. The initial assumption is thus correct. As a result, there is no current flow through resistances 7 and 8 due to the common mode signal and no undesired differential signals are developed. As a practical matter, infinite impedance is achieved only if the voltage fed back to terminals 11 and 12 is exactly equal to the change in the common mode potential. This depends upon the gain of amplifier 23 times the attenuation of the respective attenuators being exactly unity. Deviations therefrom cause the effective input impedance presented to the common mode signal to be less than infinite, although very large. If the deviation from unity is Δ, then the effective input impedance is $$\frac{R+r}{\Delta}$$

While the input signal applied to amplifier 23 is derived from terminal 12, operation is satisfactory when this input signal is received instead from terminal 11.

Referring to Fig. 2, there is illustrated a schematic circuit diagram of a preferred form of amplifier 23 having a gain of +2. This circuit includes an input stage having a pair of differentially-connected electron tubes V1 and V2. A common cathode resistor 31 is connected between the cathodes of tubes V1 and V2 and a source of negative potential applied on terminal 32. Resistors 33 and 34 of equal value are connected from a source of positive potential applied on terminal 35 to the plates of tubes V1 and V2, respectively. Input terminal 11 is direct coupled to the grid of tube V1. The grid of tube V2 is connected to the junction of resistors 37 and 36. The latter resistors are of the same value and connected in series between output line 26 and ground.

Tubes V3 and V4 form a second amplifying stage energized by oppositely-phased signals from the input stage. A common cathode resistor 41 is connected between the cathodes of tubes V3 and V4 and terminal 32. The plates of tubes V1 and V2 are respectively connected to the grids of tubes V4 and V3. The plate of tube V3 is directly connected to positive terminal 35. A load resistor 42 is connected between terminal 35 and the plate of tube V4.

A cathode follower stage including electron tube V5 couples the output of the second amplifier stage to output line 26. Cathode resistor 43 is connected from the cathode of tube V5 to terminal 32. The grid of tube V5 is connected to the junction of an attenuator formed by resistors 44 and 45 connected in series between the plate of tube V4 and negative terminal 32. The plate of tube V5 is directly connected to positive terminal 35.

Operation is as follows: The signal developed between the plates of tubes V1 and V2 is proportional to the difference between the grid potentials of these tubes. Resistors 37 and 36 effectively attenuate the output potential on terminal 26 by a factor of one-half. Therefore, the amplified signal provided between the plates of tubes V1 and V2 is proportional to the difference between the input potential on terminal 11 and one-half the output potential on terminal 26. This potential difference is amplified by the second stage and coupled to an output line 26 by cathode follower V5. The potential on output terminal 26 will be continuously altered until the difference between the grid potentials on tubes V1 and V2 is substantially zero. At this time, the voltage on terminal 26 is exactly twice that on terminal 11. Therefore, the amplifier providing the desired gain of +2 is provided.

A novel system has been described capable of effectively presenting infinite input impedance to transducers providing low level potential differences which it is desired to accurately determine. In a representative embodiment of the invention, a novel amplifier system arranged according to the invention and embodying the concepts disclosed in the aforesaid co-pending applications accurately amplifies differences in potential of as low as 5 microvolts.

It is apparent that those skilled in the art may now make numerous modifications of and departures from the specific embodiment described herein without departing from the inventive concepts. Consequently, the invention is to be construed as limited only by the spirit and scope of the appended claims.

What is claimed is:

1. Apparatus for amplifying the differential mode of first and second input signals which may also have a common mode comprising, a differential amplifier having first and second inputs and an output, a feedback resistor of value R connected from said output to said first input and providing an inverse feedback path therebetween, first and second input terminals adapted to receive said first and second input signals respectively, first and second input resistors of value *r* respectively connected from said first and second input terminals to said first and second differential amplifier inputs respectively, a common terminal, a resistor of value R connected from said second differential input to said common terminal, a signal amplifier having a gain of substantially plus two, means for coupling one of said input terminals to the input of said signal amplifier, and first and second positive feedback resistors of value $R+r$ connected from the output of said signal amplifier to said first and second input terminals respectively.

2. Apparatus for amplifying the differential mode of first and second input signals comprising, a differential amplifier having first and second inputs, a feedback resistor of value R coupled between the output of said differential amplifier and one of said inputs, a resistor of value *r* coupling the other of said inputs to a reference potential source, first and second resistors of equal value respectively coupling the first and second inputs of said differential amplifier to first and second signal input terminals, an amplifier having its input connected to one of said signal input terminals, and attenuator means connecting the output of said amplifier to said first and second signal input terminals whereby the output signal of said amplifier at each of said terminals is equal to the common mode signal applied at said terminals.

3. Apparatus for amplifying the differential mode of first and second input signals comprising, a differential amplifier having first and second inputs, a feedback resistor coupled between the output of said differential amplifier and one of its inputs, a resistor coupling the other of said inputs to a reference potential source, first and second resistors respectively coupling the first and second inputs of said differential amplifier to first and second signal input terminals, a second amplifier having its input connected to one of said signal input terminals, said second amplifier having a gain of two, first and second attenuators respectively connecting the output of said second amplifier to said first and second terminals, and said attenuators causing the second amplifier output signal at each of said terminals to equal the common mode signal thereat applied.

References Cited in the file of this patent

UNITED STATES PATENTS

| | | |
|---|---|---|
| 2,846,522 | Brown | Aug. 5, 1958 |
| 2,866,018 | Bell | Dec. 23, 1958 |